Sept. 4, 1923.
J. GRUNDLER
SHOCK ABSORBING SPRING
Filed July 11, 1921
1,467,035
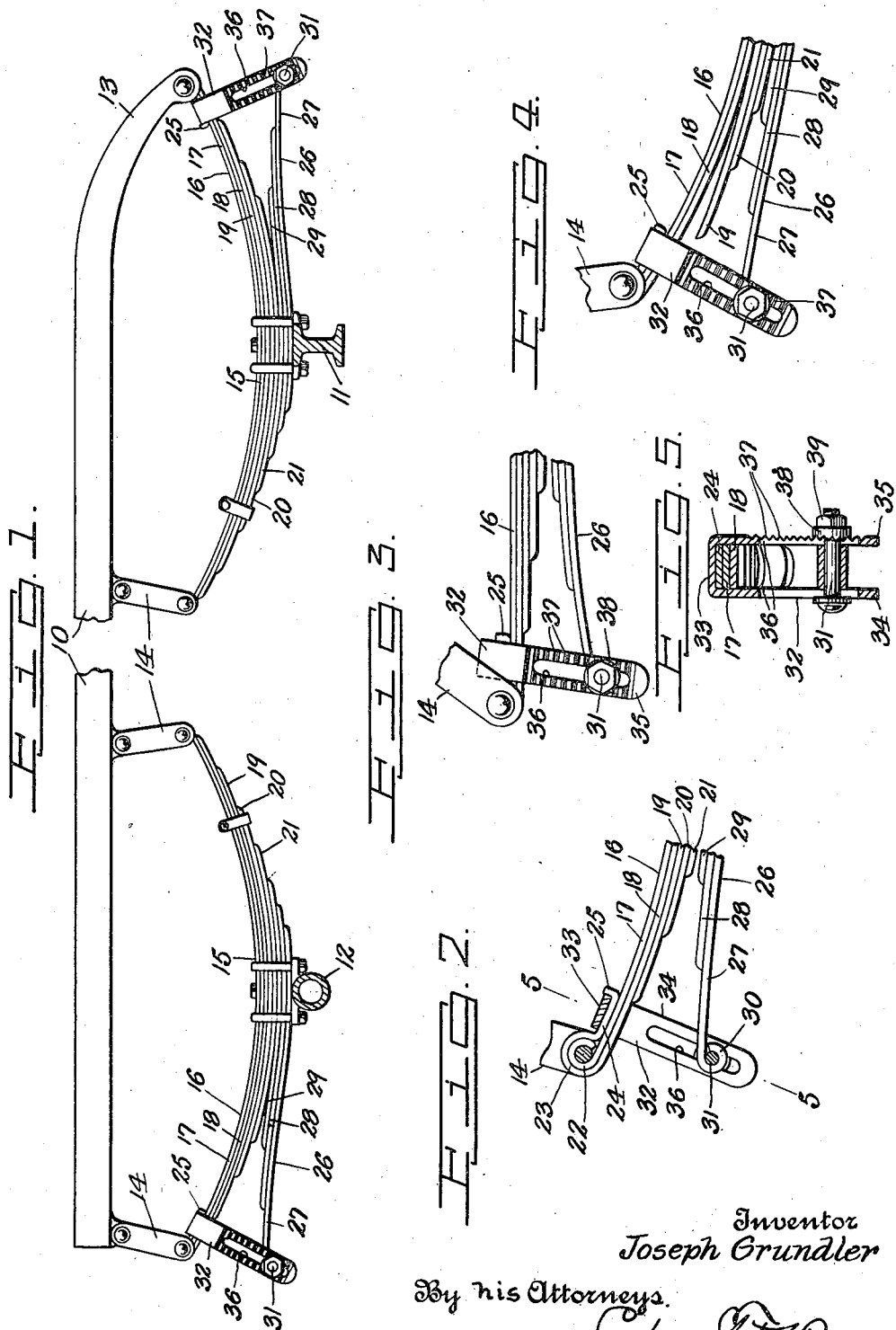
Inventor
Joseph Grundler
By his Attorneys.
Edgar Tate & Co.

Patented Sept. 4, 1923.

1,467,035

UNITED STATES PATENT OFFICE.

JOSEPH GRUNDLER, OF NEW YORK, N. Y., ASSIGNOR TO PERFECT SHOCK ABSORBER SPRING COMPANY, INC., OF NEW YORK, N. Y.

SHOCK-ABSORBING SPRING.

Application filed July 11, 1921. Serial No. 483,646.

*To all whom it may concern:*

Be it known that I, JOSEPH GRUNDLER, a citizen of the United States, and residing at New York, in the county of New York and State of New York, have invented certain new and useful Improvements in Shock-Absorbing Springs, of which the following is a specification, such as will enable those skilled in the art to which it appertains to make and use the same.

This invention relates to shock absorbing springs for vehicles of various kinds and classes, and particularly motor vehicles, and the object of the invention is to provide a spring of the class specified and of the laminated leaf type, a predetermined number of the leaves of which are extended outwardly and downwardly to form a supplemental spring section which functions in the recoil or rebound action of springs of this class; a further object being to provide adjustable means for coupling the free end portion of the supplemental spring section with one end portion of the main spring section; a further object being to provide means for reinforcing that end portion of the main spring section with which the coupling member is connected and for holding said coupling member in position thereon; a further object being to provide a spring construction of the class and for the purpose specified which in addition to functioning as a shock absorbing spring, will also serve to retain the axles of the vehicle in proper position and to reinforce and strengthen the main spring section of the spring construction, and with these and other objects in view the invention consists in a shock absorbing spring construction of the class and for the purpose specified which is simple in construction and operation and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic side view of the chassis of a motor vehicle with part of the construction broken away and showing my improved front and rear spring constructions mounted in connection with the chassis and front and rear axles;

Fig. 2 a detail sectional view of one end portion of one of the spring constructions shown in Fig. 1;

Figs. 3 and 4 detail views of one end portion of one of the spring constructions shown in Fig. 1 and indicating two different actions of said spring construction; and, Fig. 5 a partial section on the line 5—5 of Fig. 2.

In Fig. 1 of the drawing, I have shown at 10 a part of a chassis of a motor vehicle and at 11 and 12 I have indicated in section the front and rear axles of the vehicle.

The front end portion of the chassis 10 is curved outwardly and downwardly as shown at 13, and spring hangers 14 in the form of links or the like are pivoted to or suspended from the chassis in the usual or any desired manner.

Mounted upon the front and rear axles 11 and 12 are two of my improved spring constructions 15. The spring constructions 15 are of the laminated leaf type and are composed of main spring sections 16 composed, in the construction shown, of five laminations or leaves 17, 18, 19, 20 and 21 of different lengths. The ends of the uppermost laminations 17 are provided with loops 22, one of which is shown in Fig. 2 of the drawing, through which the pivot pins of the hangers 14 and the front curved end 13 of the chassis 10 pass. One end portion of the lamination or leaf 18 of the spring sections are also passed around the loops 22 at the corresponding end portion of said spring sections as shown at 22 in Fig. 2 of the drawing, and said end portion is also passed inwardly over the top face of the lamination or leaf 17 of said spring sections as shown at 24 and the ends of which are bent upwardly as shown at 25.

My improved spring construction also involves a supplemental shock absorbing spring section 26 composed, in the form of construction shown, of three laminations or leaves 27, 28 and 29 of different lengths, and said laminations or leaves are extended at one end portion of said spring sections and the laminations or leaves 27 thereof are provided at their ends with loops 30, one of which is shown in Fig. 2 of the drawing, through which bolts 31 are adapted to pass.

I also employ coupling members 32 which are yoke-shaped in form and the cross heads 33 of which are adapted to pass over the main spring sections 16 and operate in connection with the parts 24 and 25 of the leaves 18 of said spring sections and the side members 34 and 35 of said coupling members 32 are provided with elongated apertures 36 through which the bolts 31 pass, and the outer faces of the side members 35 of said coupling members are provided with a plurality of teeth or projections 37 in connection with which washers 38 having corresponding teeth or projections operate. The washers 38 are mounted upon the bolts 31 and are drawn into position by nuts 39 on said bolts, and by means of this construction the end portions of the supplemental spring sections may be raised or lowered in the coupling members 32 to increase or decrease the tension of said supplemental spring sections.

It will be noted upon a consideration of Fig. 1 of the drawing that the spring construction 15 at the front and rear of the vehicle, or mounted in connection with the front and rear axles 11 and 12, are exactly the same and the supplemental spring sections 26 thereof are directed forwardly on the front spring construction and backwardly on the rear spring construction. In Figs. 2, 3 and 4 of the drawing I have shown the rear end portion of the rear spring construction 15 and in Figs. 3 and 4 I have indicated two approximate positions assumed by said spring construction in two different operations or actions thereof, and in Fig. 3 I have shown the spring construction moved upwardly in which the main spring section 16 is placed under tension and partially or wholly straightened out, and the supplemental spring section correspondingly moved, and in this operation it will be noted that the coupling member 32, or the cross head portion 33 thereof, moves upwardly and out of engagement with the corresponding end portion of the main spring section. In Fig. 4 of the drawing I have shown the recoil or rebound action of the spring construction, in which operation the entire spring construction moves downwardly and the tension of the supplemental spring section is increased to take up the shock, and in this operation the laminations or leaves 19, 20 and 21 of the main spring section, or the free end portions thereof, will part from the remaining laminations or leaves 17 and 18 as is indicated in Fig. 4 of the drawing.

As previously stated the tension of the supplemental spring sections 26 may be regulated by adjusting the bolts 31 upwardly or downwardly in the coupling members 32. It will also be apparent that the parts 24 and 25 of the main spring sections 16 serve to retain the coupling members 32 in position as well as to reinforce the end portions of said spring sections in connection with which the coupling members 32 operate, and while I have shown certain details of construction for carrying my invention into effect, it will be apparent that I am not necessarily limited to these details, and various changes therein and modifications thereof may be made, within the scope of the appended claims, without departing from the spirit of my invention or sacrificing its advantages.

One of the advantages of my invention is that in the event of the front wheels of a vehicle dropping suddenly into a hole or holes, or striking obstructions on a roadway that the chassis of the vehicle has a tendency to move forwardly independent of the wheels and front axle, and one of the principal objects of my front spring construction is to relieve the usual strain on said spring construction by introducing the supplemental spring section and the coupling member for mounting the free end portion of said supplemental spring construction in connection with the main spring construction. In other words, my improved front spring construction aids in holding or retaining the front axle in proper relation with the framework of the vehicle.

Having fully described my invention, what I claim as new and desire to secure by Letters Patent, is:—

1. A spring construction of the class described comprising a main spring section and a supplemental spring section, one end portion of the supplemental spring section being extended, a coupling member adjustably mounted in connection with the supplemental spring section and movably mounted in connection with the main spring section, two of the leaves at one end of the main spring section being passed around the support therefor and one of said leaves being extended backwardly upon the leaves of said spring section and provided at its end with a part extending at right angles thereto to reinforce said end of the main spring section and to provide means for retaining said coupling member in proper position on the main spring section.

2. A spring construction of the class described comprising a main spring section and a supplemental spring section, one end portion of the supplemental spring section being extended, a coupling member adjustably mounted in connection with the supplemental spring section and movably mounted in connection with the main spring section, and means integral with the end portion of the main spring section in connection with which said coupling member operates for reinforcing said main spring section and for retaining said coupling member in predetermined position on said main spring section.

3. A spring construction of the class described comprising a main spring section and a supplemental spring section, a coupling member adjustably mounted in connection with the free end of said supplemental spring section and movably mounted in connection with the corresponding end of the main spring section and said end portion of the main spring section being folded backwardly upon itself to reinforce said main spring section, where the coupling member cooperates therewith and means on said main spring section for retaining said coupling member in predetermined position in the movement thereof, relatively to said main spring section.

4. A spring construction of the class described comprising a main spring section and a supplemental spring section, one end portion of the supplemental spring section being extended, a coupling member adjustably mounted in connection with said supplemental spring section and movably mounted in connection with the main spring section, means for reinforcing the end portion of the main spring section in connection with which said coupling member operates, and means on said last named means for normally retaining said coupling member in predetermined position.

5. A spring construction of the class described comprising a main spring section and a supplemental spring section, one end portion of the supplemental spring section being extended, a coupling member adjustably mounted in connection with and carried by said supplemental spring section, and spanning and cooperating with said main spring section, and means integral with said main spring section for reinforcing that portion thereof in connection with which said coupling member operates and for normally retaining said coupling member in predetermined position thereon.

In testimony that I claim the foregoing as my invention I have signed my name in presence of the subscribing witnesses this 9th day of July, 1921.

JOSEPH GRUNDLER.

Witnesses:
C. E. MULREANY,
H. E. THOMPSON.